(12) United States Patent
Terayama

(10) Patent No.: US 11,556,383 B2
(45) Date of Patent: Jan. 17, 2023

(54) SYSTEM AND METHOD FOR APPRAISING RESOURCE CONFIGURATION

(71) Applicant: Hitachi, Ltd., Tokyo (JP)

(72) Inventor: Atsumi Terayama, Tokyo (JP)

(73) Assignee: HITACHI, LTD., Tokyo (JP)

( * ) Notice: Subject to any disclaimer, the term of this patent is extended or adjusted under 35 U.S.C. 154(b) by 113 days.

(21) Appl. No.: 17/186,193

(22) Filed: Feb. 26, 2021

(65) Prior Publication Data

US 2022/0066823 A1 Mar. 3, 2022

(30) Foreign Application Priority Data

Aug. 27, 2020 (JP) .............................. JP2020-143644

(51) Int. Cl.
*G06F 9/48* (2006.01)
*G06F 9/50* (2006.01)

(52) U.S. Cl.
CPC .............. *G06F 9/5005* (2013.01); *G06F 9/48* (2013.01); *G06F 9/485* (2013.01); *G06F 9/4806* (2013.01); *G06F 9/4843* (2013.01); *G06F 9/4856* (2013.01); *G06F 9/4875* (2013.01); *G06F 9/4881* (2013.01); *G06F 9/50* (2013.01); *G06F 9/505* (2013.01); *G06F 9/5027* (2013.01); *G06F 9/5044* (2013.01); *G06F 9/5083* (2013.01); *G06F 9/5088* (2013.01)

(58) Field of Classification Search
CPC ........ G06F 9/48; G06F 9/4806; G06F 9/4843; G06F 9/485; G06F 9/4856; G06F 9/4875; G06F 9/4881; G06F 9/50; G06F 9/5005; G06F 9/5027; G06F 9/5044; G06F 9/505; G06F 9/5077; G06F 9/5083; G06F 9/5088
See application file for complete search history.

(56) References Cited

U.S. PATENT DOCUMENTS

| 9,864,749 | B2 | 1/2018 | Basak et al. | |
|---|---|---|---|---|
| 2015/0007176 | A1* | 1/2015 | Kotani | G06F 11/3433 718/1 |
| 2015/0113338 | A1* | 4/2015 | Maruyama | G06F 11/3485 714/48 |
| 2015/0143364 | A1* | 5/2015 | Anderson | G06F 9/5016 718/1 |

(Continued)

*Primary Examiner* — Charles M Swift
(74) *Attorney, Agent, or Firm* — Baker Botts L.L.P.

(57) ABSTRACT

To more properly size resources in a destination to which IT resources will be migrated, a system for appraising a resource configuration estimates a source's load model representing a load of first resources in a first computer system which is the source of migration and estimates a destination's load model representing a load of second resources to be built by migrating the first resources to a second computer system based on the source's load model. The system compares performance requirements of the first resources against the destination's load model and finds the destination's load model that is conformable to the performance requirements. When determining design values of the second resources' configuration, the system corrects those design values based on the destination's load model estimated conformable to the performance requirements to decrease design margins of the resource configuration using a design correction value defined to meet a service level requested.

10 Claims, 14 Drawing Sheets

(56) References Cited

U.S. PATENT DOCUMENTS

| | | | |
|---|---|---|---|
| 2016/0098292 A1* | 4/2016 | Boutin | G06F 9/505 |
| | | | 718/104 |
| 2018/0081730 A1* | 3/2018 | Duttagupta | G06F 9/5027 |
| 2020/0304571 A1* | 9/2020 | Ranjan | G06F 3/0605 |

* cited by examiner

FIG.5

GRADE DEFINITION INFORMATION

320

| | GRADE | | |
|---|---|---|---|
| | G0 | G1 | G2 |
| CAPACITY UNIT PRICE | 0.1 [$/GB] | 0.05 [$/GB] | 0.02 [$/GB] |
| DESIGNATION | GOLD | SILVER | BRONZE |
| STANDARD IOPS | 500 [IOPS] | 200 [IOPS] | 120 [IOPS] |
| STANDARD RESPONSE TIME | 10 [ms] | 25 [ms] | 30 [ms] |
| DESIGN CORRECTION VALUE | 0.95 | 0.8 | 0.7 |

FIG.6

VOLUME PERFORMANCE INFORMATION 321

| VOLUME ID 321a | USAGE CAPACITY 321b | IOPS 321c | RESPONSE TIME 321d | TRANSFER TRAFFIC 321e | READ RATIO 321f | RANDOM RATIO 321g | CACHE HIT RATIO 321h |
|---|---|---|---|---|---|---|---|
| VL_02:30 | 123 [GB] | 120 [IOPS] | 34 [ms] | 4.5 [MB/s] | 90 [%] | 72 [%] | 9 [%] |
| ... | ... | ... | ... | ... | ... | ... | ... |
| VL_1A:00 | 211 [GB] | 12 [IOPS] | 8 [ms] | 1.1 [MB/s] | 32 [%] | 12 [%] | 76 [%] |
| VL_1A:01 | 115 [GB] | 301 [IOPS] | 49 [ms] | 19.9 [MB/s] | 70 [%] | 45 [%] | 21 [%] |
| ... | ... | ... | ... | ... | ... | ... | ... |
| VL_F0:10 | 320 [GB] | 208 [IOPS] | 27 [ms] | 7.0 [MB/s] | 85 [%] | 90 [%] | 10 [%] |
| VL_F0:11 | 83 [GB] | 497 [IOPS] | 2 [ms] | 81.2 [MB/s] | 51 [%] | 79 [%] | 50 [%] |
| ... | ... | ... | ... | ... | ... | ... | ... |

FIG.7

INSTANCE CONFIGURATION INFORMATION 322

| | | INSTANCE ID | | |
|---|---|---|---|---|
| | | A001 | A002 | B330 |
| GENERAL | TEMPLATE | Web-std | DB-ext | App-gen |
| | DESIGNATION | web_svr-01 | DB04 | Test-t001 |
| | SYSTEM NAME | SYS-201 | SYS-093 | SYS-201 |
| | CLASSIFICATION | VIRTUAL | PHYSICAL | VIRTUAL |
| | OWNER | Group67::User1 | Group67::User2 | Group67::User1 |
| SERVER | ID | SVR 01V | SVR 01P | SVR f0V |
| | CPU | 2GHz x4 | 3.2GHz x16 | 2GHz x2 |
| | RAM | 8GB | 16GB | 4GB |
| | ... | | | |
| NETWORK | NIC1 | veth0 | eth0 | veth0 |
| | NIC2 | veth1 | eth1 | – |
| | NIC3 | – | – | – |
| | ... | | | |
| STORAGE | DISK ID | D01-203, D01-204 | D02-001, D02-002 | D03-201 |
| | CLASSIFICATION | VIRTUAL | PHYSICAL | VIRTUAL |
| | CAPACITY | 120GB/500GB | 160GB/500GB | 300GB |
| | VOLUME | VL 02:30 | VL1A:01 | VL F0:11 |
| | ... | | | |

FIG.8

VOLUME TYPE INFORMATION

420

| | VOLUME TYPE | | |
|---|---|---|---|
| | ssd-io1 | ssd-cp2 | hdd-cp1 |
| CHARGING SCHEME | MAXIMUM PERFORMANCE BASED | BUCKET BASED | BUCKET BASED |
| CAPACITY UNIT PRICE | 0.2 [$/GB] | 0.15 [$/GB] | 0.05 [$/GB] |
| BASELINE PERFORMANCE PER CAPACITY | 3 [IOPS/GB] | 3 [IOPS/GB] | 1.5 [IOPS/GB] |
| BURSTABLE IO | 5,000 [IOPS] (250 [$]) | - | - |
| PERMISSIBLE BUCKET IO | - | 2,000 [IO] | 500 [IO] |

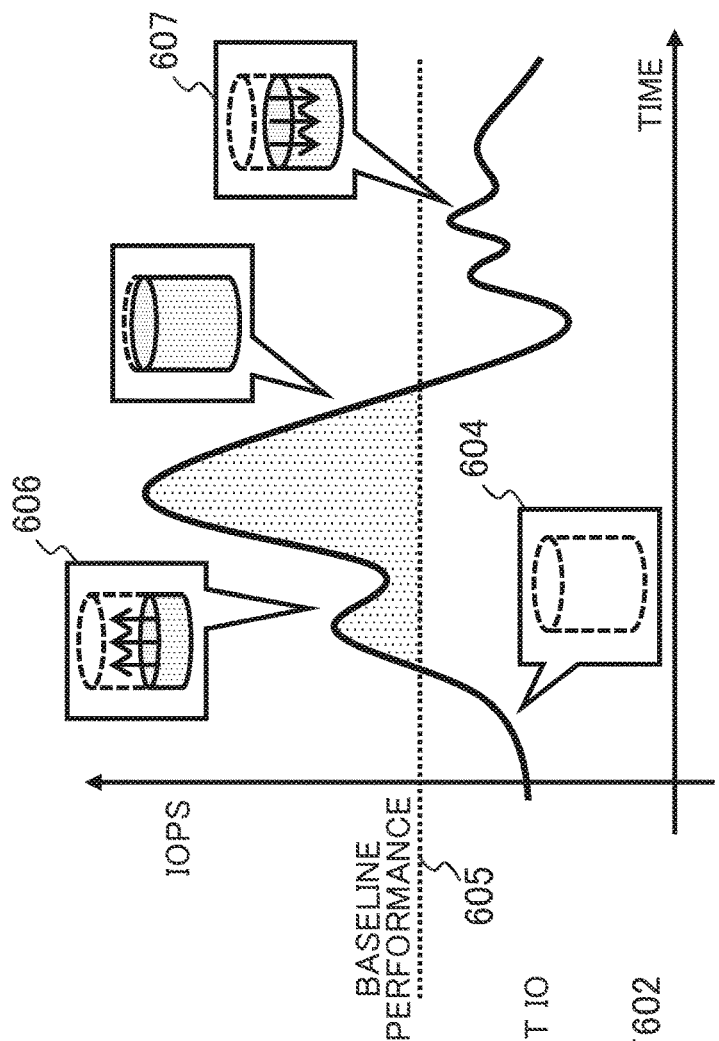
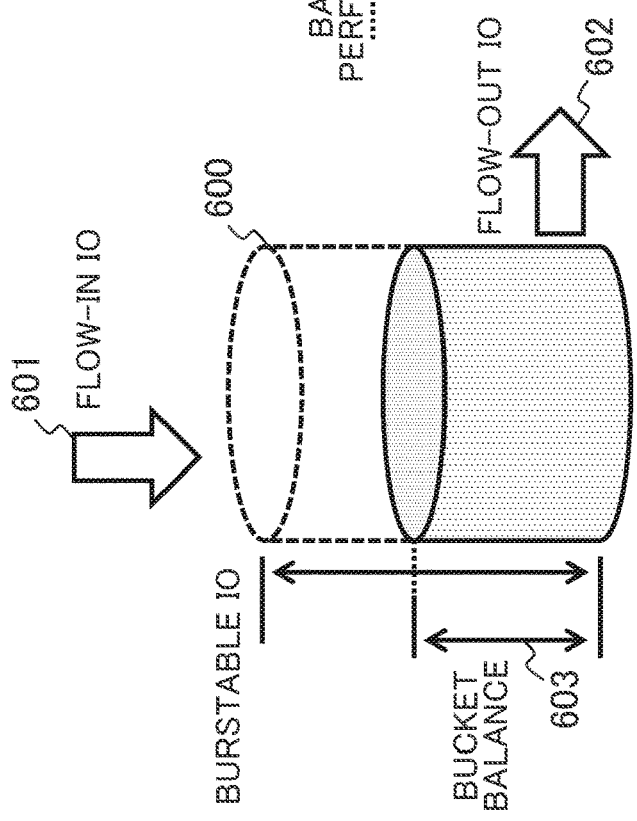

FIG.10

VOLUME PERFORMANCE INFORMATION 421

| VOLUME ID | USAGE CAPACITY | IOPS | BUCKET BALANCE | TRANSFER TRAFFIC |
|---|---|---|---|---|
| VL G001 | 124 [GB] | 120 [IOPS] | – | 12.4 [MB/s] |
| VL P002 | 832 [GB] | 209 [IOPS] | 30[%] | 7.3 [MB/s] |
| VL P003 | 433 [GB] | 770 [IOPS] | 10[%] | 2.1 [MB/s] |
| ⋮ | ⋮ | ⋮ | ⋮ | ⋮ |

SYSTEM AND METHOD FOR APPRAISING RESOURCE CONFIGURATION

BACKGROUND

The present invention relates to a system and method for appraising a resource configuration.

In the field of information systems, a manner of usage called cloud computing has become popular and has enabled business operators such as companies and municipalities to offer information services without possessing their own systems. So-called public clouds offer a variety of services according to functional and non-functional requirements. By optionally choosing and combining from such services, users can build a desired service at less cost than when it is built in their own systems.

On the other hand, in some circumstances, business operators may prefer to keep their own information systems as is (on-premises), as prevailed heretofore, from the perspectives of, inter alia, maintainability, security protection, and service quality mainly other than cost. Therefore, it becomes important to selectively use different environments, namely, on-premises, private cloud, and public cloud according to individual services, instead of using any one environment to take all roles.

User environments allowing for selective use of different environments are called multi-cloud or hybrid cloud. Because there is a demand change in the user side, attributed to a system lifecycle and business circumstances, and because functionality and specifications provided by each cloud differ in a variety of respects, users have to monitor and periodically revise resource configurations to be fit for a system.

For instance, when IT resources such as servers and storages existing in an on-premises environment are migrated to a public cloud, their configuration in the migration destination must be designed to adequately process the load that took place in the migration source. Because, especially, storage resources once built are relatively hard to change their configuration, various sizing methods and their automation techniques are proposed.

As one of these related-art techniques, e.g., U.S. Pat. No. 98,647,492 discloses a highly accurate sizing technique in which the characteristics of the loads in the migration source and destination are extracted by machine learning and managed as patterns of resource configurations.

SUMMARY

According to the related-art technique disclosed in U.S. Pat. No. 98,647,492, because information on individual loads can be patterned, sizing can be completed by finding an approximate pattern even when a rather unexpected load is observed. Besides, even when a user who is going to perform sizing is unfamiliar to knowledge regarding the management and configuration design of, particularly, storage resources, the user can appraise a suitable configuration in the migration destination. Furthermore, even if there are differences in configurations and setting values with respect to target systems, models pertaining to sizing can be built and modified automatically. It is thus possible to obtain a highly reliable result of sizing that is robust to environment change.

Nevertheless, to enhance the accuracy of sizing, it is required to collect a wide variety of numerous configuration patterns and perform learning processing beforehand. To do this, naturally, it takes a long time and large quantities of load data and configuration information are needed. Large throughput is required to implement the foregoing technique and it is difficult to apply this technique, if a lot of unknown variables are included in load data and configuration information.

Besides, if a configuration obtained as a result of sizing does not have load characteristics as expected after migration is actually complete, an effective way of how to modify the configuration is unknown, since relations among respective items of design are unobvious.

By the way, management of IT resources typically takes a surplus quantity of resources into account in preparation for a sizing error, an unexpected increase in load, and fault occurrence. Because of including these margins for safety, in most cases, a quantity of resources for practical use is estimated more than the quantity that is really used. This tendency is noticeable particularly for core systems where deterioration in service quality has a large impact on business results.

Especially, in the case of storage resources, because data placement is abstracted according to the structures of file systems or the like, capacity is easy to expand, whereas hard to shrink. In this regard, setting large margins for safety could result in an excessive cost of using resources, depending on how to set margins in a sizing process, since it is hard to shrink capacity later to meet actual status of using resources.

In view of the matters described above, the present invention is intended to more properly size resources in a destination to which IT resources will be migrated.

To solve problems suggested above, the present invention resides in a system for appraising a resource configuration of second resources to be built by migrating first resources existing in a first computer system which is the source of migration to a second computer. The system includes a source's load model estimating unit that estimates a source's load model representing a load of the first resources, a destination's load model estimation unit that estimates a destination's load model representing a load of the second resources based on the source's load model, and a destination-related configuration designing unit that compares performance requirements of the first resources against the destination's load model estimated by the destination's load model estimation unit, finds the destination's load model that is conformable to the performance requirements, and determines design values of the resource configuration based on the destination's load model found to be conformable. The destination-related configuration designing unit corrects the design values of the resource configuration based on the destination's load model conformable to the performance requirements to decrease design margins of the resource configuration using a design correction value defined to meet a service level requested.

According to the present invention, it is possible to more properly size resources in a destination to which IT resources will be migrated.

BRIEF DESCRIPTION OF THE DRAWINGS

FIG. 5 is a diagram exemplifying grade definition information in the first computer system of the first embodiment.

FIG. 6 is a diagram exemplifying volume performance information in the first computer system of the first embodiment.

FIG. 7 is a diagram exemplifying instance configuration information according to the first embodiment.

FIG. 8 is a diagram exemplifying volume type information in the second computer system of the first embodiment.

FIG. 9A is a diagram depicting a concept of a bucket-based charging method in the second computer system of the first embodiment.

FIG. 9B is a diagram depicting a concept of a bucket-based charging method in the second computer system of the first embodiment.

FIG. 10 is a diagram exemplifying volume performance information in the second computer system of the first embodiment.

DETAILED DESCRIPTION

Figure 1:
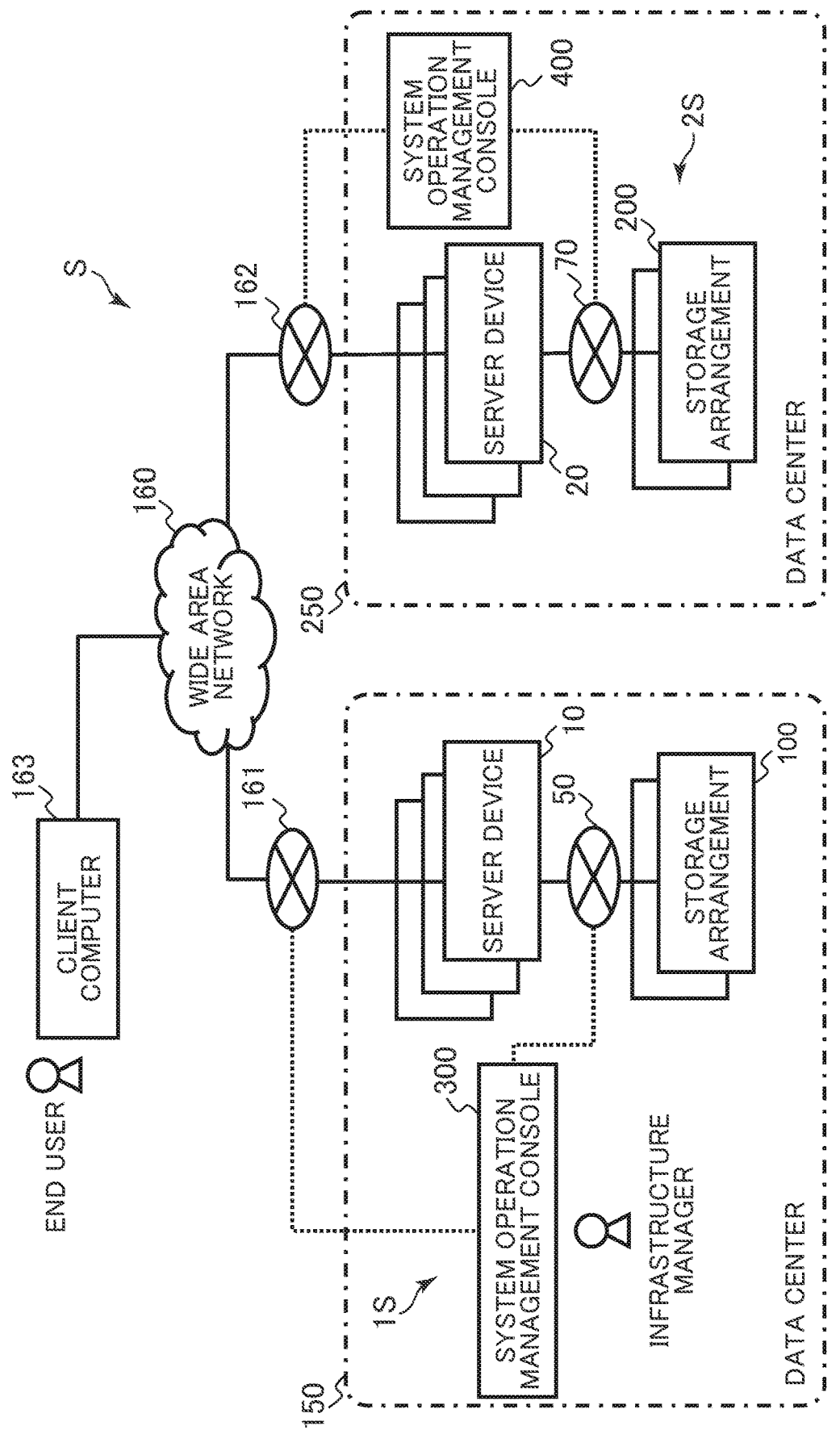
FIG. 1 is a diagram depicting an overview of an overall architecture of a computer system according to a first embodiment.

In the following, embodiments of the present invention are described with reference to the drawings. The embodiments are illustrative for explaining the present invention and some part of their descriptions may be omitted and simplified appropriately to clarify the descriptions. The present invention may be carried out in other diverse embodiments. Each individual component may be either a single one or multiple ones, unless otherwise specified.

By way of example, diverse pieces of information may be described using representations such as "tables", "lists", and "queues"; however, diverse pieces of information may be represented in a data structure other than those mentioned above. For example, an "XX table", "XX list", "XX queue" etc. may be termed as "XX information". When identification information is mentioned, terms such as "identifying information", "identifier", "designation", "ID", and "number" may be used, but these terms can be replaced with each other. Diverse pieces of information are stored in a storage area of a volatile or non-volatile memory device.

When multiple components having an identical or similar function exist, they may be identified in a description about them by using one reference numeral with different subscripts. However, when it is not needed to individualize the multiple components, they may be mentioned without the subscripts.

Description of an embodiment may concern processing that is performed by executing a program. A computer executes a program through a processor (CPU (Central Processing Unit), GPU (Graphics Processing Unit), etc.), while using storage resources (such as a memory) and/or an interface device (such as a communication port), thus performing programmed processing. Hence, an actor that performs processing through program execution may be regarded as either an "XXX unit" or a processor.

Likewise, an actor that performs processing through program execution may be a controller, a machine, a system, a computer, or a node, all of them including a processor. An actor that performs processing through program execution may be any computational unit and may include a dedicated circuit that performs specific processing. Dedicated circuits termed herein are, e.g., an FPGA (Field Programmable Gate Array), an ASIC (Application Specific Integrated Circuit), a CPLD (Complex Programmable Logic Device), etc.

Programs may be installed from their source into a computer. The source of programs may be, e.g., a program distribution server or a computer-readable storage medium. If the source of programs is a program distribution server, the program distribution server may include a processor and storage resources to store programs to be distributed and its processor may distribute those programs to other computers. Besides, in an embodiment, two or more programs may be implemented as a single program or a single program may be implemented as two or more programs.

Description of an embodiment assumes that storage resources are what are to be migrated from a first computer system to a second computer system; however, this is non-limiting. General IT resources such as servers and network devices can be regarded as what are to be migrated.

First Embodiment

Supposing that storage resources running in an on-premises environment are migrated to a public cloud, a system for appraising a configuration of those resources in the public cloud is provided as a first embodiment of the invention.

Using both an on-premises environment and a public cloud environment enables it to operate an infrastructure with an optimal configuration that meets demands for services of an IT system and requirements of security, performance, etc.

However, as for which of on-premises and cloud is better fitting in terms of cost, its decision is not constant. This depends on circumstances as follows: usage status of each environment differs; length of usage time and configuration size; and there are a lot of types of cloud services that are available. Therefore, in order to build appropriate resources to be allocated in a proper place practically and reduce cost, while meeting requirements, a means for appraising an appropriate configuration that is suitable for the operating status of a system is necessary.

<System Architecture of First Embodiment>

FIG. 1 is a diagram depicting an overview of an overall architecture of a computer system S according to the first embodiment. The computer system S is configured including a first computer system 1S and a second computer system 2S. The first computer system 1S runs in an on-premises environment. The first computer system 1S is a system that is possessed, operated, and managed by a user that offers information services to an end user.

The second computer system 2S runs in a public cloud environment. The second computer system 2S is a system in which infrastructures are offered to a user by a cloud business operator on a pay-per-use basis or other schemes.

A user who possesses the first computer system 1S can possess and manage information on configurations and performance regarding the first computer system 1S. At the same time, the user physically shares the second computer system 2S with an unspecified large number of third parties. Hence, the scope of management of the user in the second computer system 2S is limited.

The cloud business operator who operates the second computer system 2S provides usage status regarding the second computer system 2S to the user to a limited extent and authorizes the user to make a configuration change to a limited extent under certain terms of service.

Besides, the system in a cloud environment is provided with a function to swiftly build only resources as much as required, allowing for use of a required quantity of resources on a pay-per-use basis to meet a demand at times. In an on-premises environment, machines and resources are built in a form in which the user always possesses them. By using the cloud environment in response to a change in demand, the user can concentrate solely on determining a quantity of resources suitable for offering a service. This may enable it to reduce the cost for system operation management and utilization.

The first computer system 1S is an IT infrastructure that is built in a data center 150 owned by the user that offers information services and it is configured including multiple server devices 10 that provide computational resources, multiple storage arrangements 100 that provide storage resources, and an internal network 50 interconnecting them. Respective applications for offering information services run on the server devices 10 and store data into the storage arrangements 100, as required.

In the first computer system 1S, a system operation management console 300 is installed and configurations of all devices and arrangements are managed particularly by an infrastructure administrator in the user's organization. Also, the first computer system 1S is connected to a wide area network 160 via a network 161. The components of the first computer system 1S are schematically depicted in FIG. 1 and each device or arrangement may be built in one or another of multiple data centers 150 to constitute the same computer system.

The second computer system 2S is an IT infrastructure that is built in a data center 250 and it is configured including multiple server devices 20, multiple storage arrangements 200, and an internal network 70 interconnecting them. Respective applications run on the server devices 20 and store data into the storage arrangements 200, as required.

In the second computer system 2S, a system operation management console 400 is installed to manage configurations of all devices and arrangements in response to user request. Also, the second computer system 2S is connected to the wide area network 160 via a network 162. The components of the second computer system 2S are schematically depicted in FIG. 1 and each device or arrangement may be built in one or another of multiple data centers 250 to constitute the same computer system.

A client computer 163 of an end user who is a consumer of information services is connected with an application in the first computer system 1S or second computer system 2S via the wide area network 160. Through communication of the client computer 163 with each server device 10 or server device 20, the end user can receive offered information services built by the user of the first computer system 1S. The end user does not need to distinguish whether a server device to communicate with the client computer is a component of the first computer system 1S or the second computer system 2S.

Figure 2:
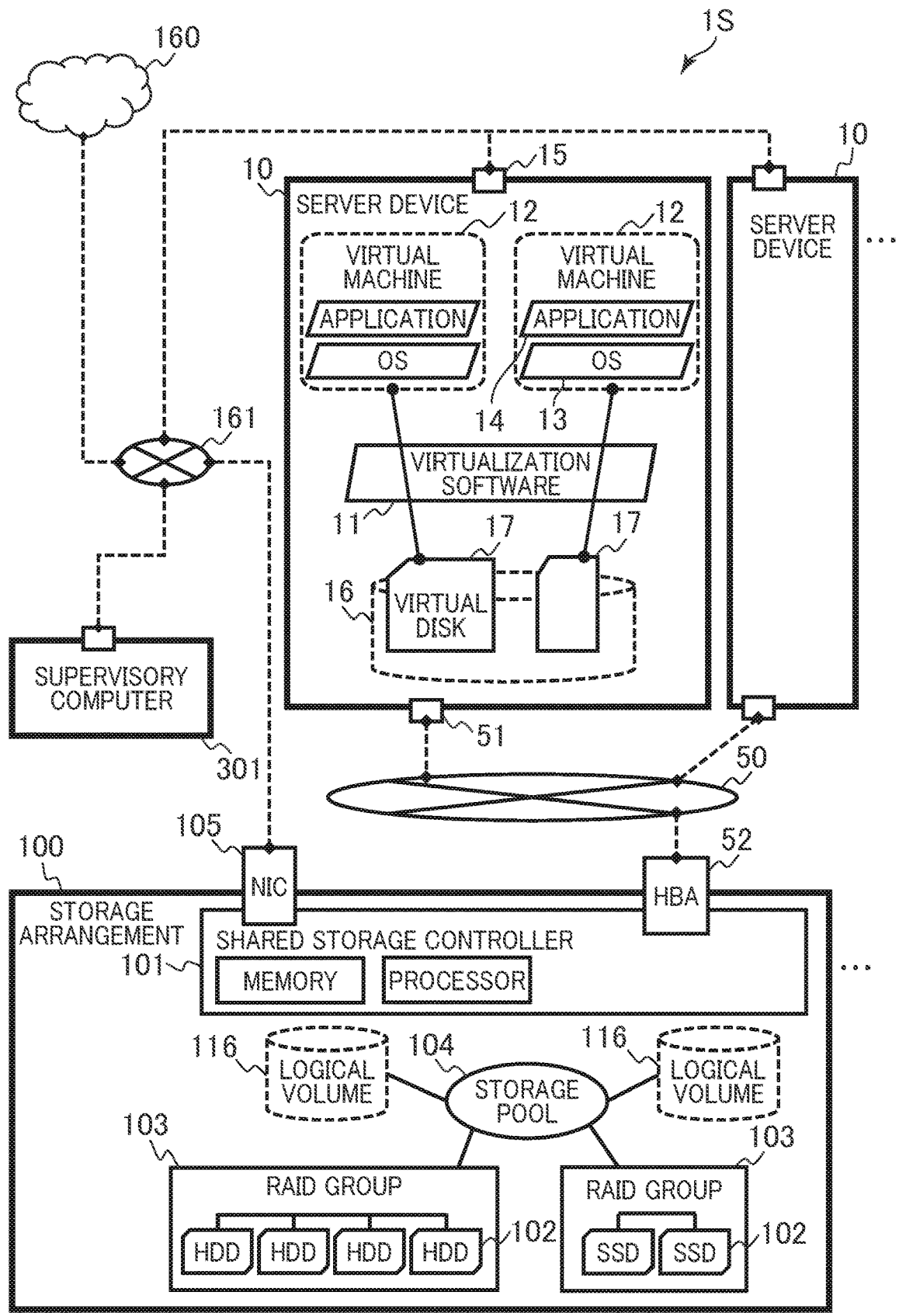
FIG. 2 is a diagram depicting a detailed architecture of a first computer system according to the first embodiment.

FIG. 2 is a diagram depicting a detailed architecture of the first computer system 1S according to the first embodiment. The first computer system 1S is configured including one or more server devices 10, one or more storage arrangements 100, a supervisory computer 301, and a network 161 interconnecting them. The network 161 is comprised of multiple network switches and the supervisory computer 301 may manage a configuration of the network switches, as required.

Moreover, a dedicated internal network 50 is built between the server devices 10 and the storage arrangements 100, so that an application will transmit and receive data through it. The internal network 50 may use a particular protocol such as Fibre Channel Protocol to transfer large volumes of data efficiently. The internal network 50 is built using network switches and adapters, as appropriate.

A server device 10 has a general computer architecture including a processor, a volatile memory, and others and runs applications 14 required for offering information services. Resources required for operation of the applications 14 are built by an OS (Operating System) 13 running directly on the server device 10 or an arrangement in which a virtual machine 12 that is implemented by virtualization software 11 to use physical resources flexibly is further adopted.

The applications 14 are connected to the network 161 via a network interface 15 of the server device. Also, a non-volatile storage area for use by the applications 14 is provided as a logical volume 16 by a storage arrangement 100. The application 14 may use the logical volume 16 directly or a virtual disk 17 form further provided by a function of the virtualization software 11. A virtual disk 17 is solely configured to have a set of files in a file system set up in the logical volume 16.

A storage arrangement 100 is an arrangement for providing a non-volatile storage area to a server device 10 and accepts simultaneous data transmission and reception to/from multiple server devices 10. In the present embodiment, the storage arrangement 100 includes a shared storage controller 101 to provide a storage function efficiently and the roles of data transmission and reception and read/write from/to a storage device are integrated in the shared storage controller 101.

The shared storage controller 101 has a configuration equivalent to a general computer architecture including a processor, a volatile memory, and others and is connected to the internal network 50 and the network 161 respectively through a Host Bus Adapter (HBA) 52 and a Network Interface Card (NIC) 105.

The storage arrangement 100 includes a large number of storage devices 102 such as Hard Disc Drives (HDDs) and Solid State Drives (SSDs). They are not directly provided as storage areas to the server devices 10 and their logical structure is further defined to facilitate configuration management.

More specifically, multiple storage devices are bundled into a group of Redundant Arrays of Independent Disks (RAID) 103. A storage pool 104 is further built and logical volumes 116 are formed. The storage pool 104 is a structure for allocating a capacity to each logical volume 116 dynamically. Multiple logical volumes 116 share the single storage pool 104, allowing for flexible capacity allocation across them. In addition, a distributed data storage function across multiple RAID groups 103 is implemented.

Performance such as IO (Input/Output) performance, latency, and bandwidth differs by type of storage devices 102. Storage areas can be hierarchized by capacity proportions of RAID groups 103 constituting the same storage pool 104. Performance and capacity unit price differ by type of storage devices 102 and multiple storage hierarchies are prepared so that a user will utilize storage resources to meet requirements of information services that the user wants to realize. These storage hierarchies are associated with grades which will be described later.

A logical volume 116 that is allocated from the storage pool 104 is taken as a logical volume 16 by a server device 10. To enhance responsibility of data read/write, the shared storage controller 101 may further use a volatile memory as a cache area. Moreover, the shared storage controller 101 is equipped with a management interface to implement management functions such as changing a configuration in response to a request from the supervisory computer 301 and acquiring performance information through the management interface.

The supervisory computer 301 runs a group of programs for management of configurations of the server devices 10 and storage arrangements 100 and realizes functionality of the system operation management console 300. These programs in a group are collectively termed as management programs and how they are organized will be described in conjunction with a detailed description of operation. The supervisory computer 301 may be built, divided into multiple computers, if necessary for making up the functionality of the system operation management console 300.

Figure 3:
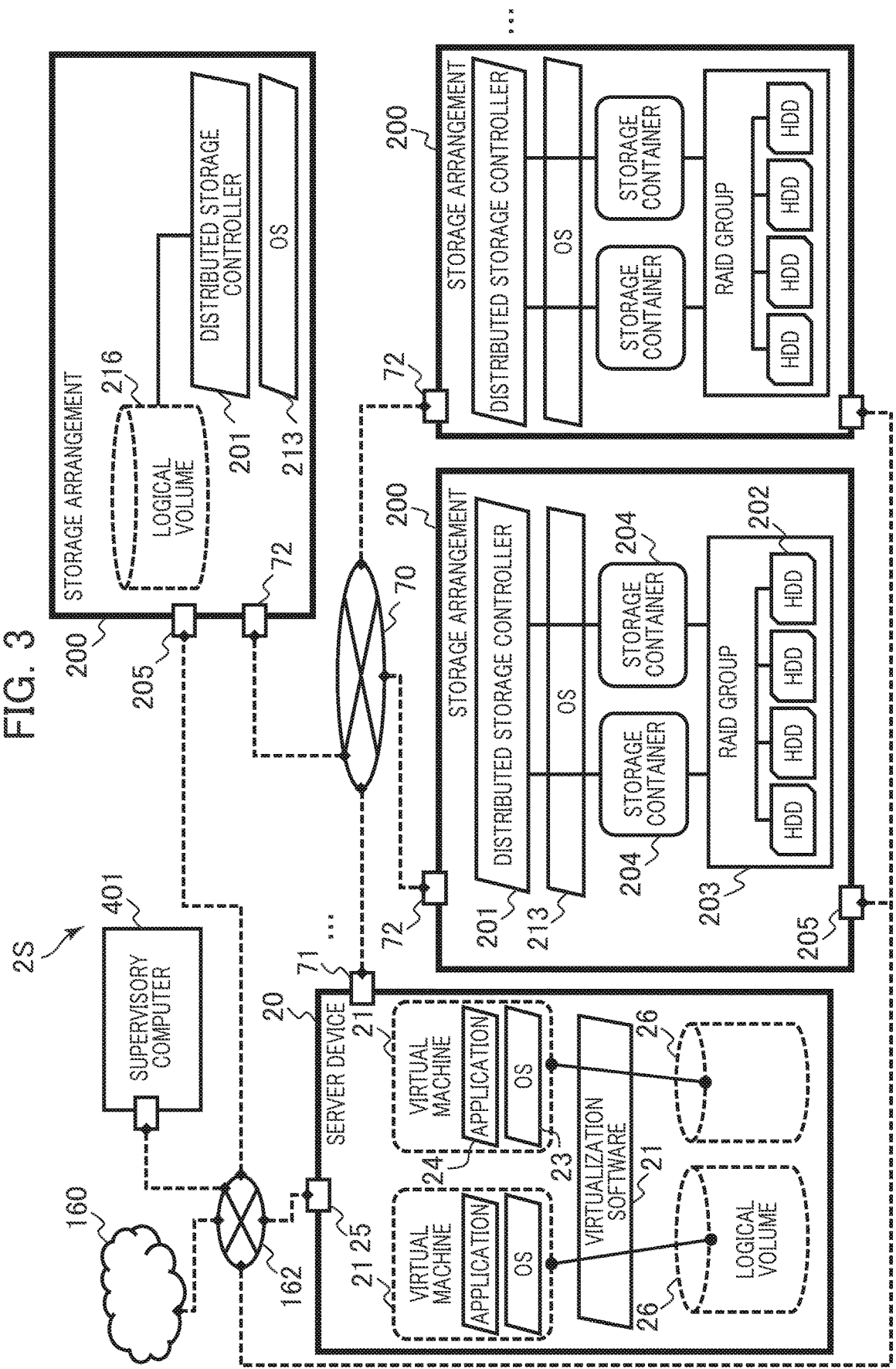
FIG. 3 is a diagram depicting a detailed architecture of a second computer system according to the first embodiment.

FIG. 3 is a diagram depicting a detailed architecture of the second computer system 2S according to the first embodiment. The second computer system 2S is configured including one or more server devices 20, one or more storage arrangements 200, a supervisory computer 401, and a network 162 interconnecting them. The network 162 is comprised of multiple network switches and the supervisory computer 401 may manage a configuration of the network switches, as required.

Moreover, a dedicated internal network 70 is built between the server devices 20 and the storage arrangements 200, so that an application will transmit and receive data through it. In the present embodiment, for example, the storage arrangements 200 are distributed storage units and operate cooperatively through the internal network 700. A server device 20 and a storage arrangement 200 are general-purpose computers that are the same physically; although pieces of software that implement the functionality of each of them may be run on a single machine, they are assumed to be separate machines for the sake of explanation.

A server device 20 has a general computer architecture including a processor, a volatile memory, and others and runs applications 24 required for offering information services. Resources required for running of the applications 14 are built by an OS 23 running directly on the server device 20 or an arrangement in which a virtual machine 22 that is implemented by virtualization software 21 to use physical resources flexibly is further adopted. The applications 24 are connected to the network 162 via a network interface 25 of the server device 20. A non-volatile storage area for use by the applications 14 is provided as a logical volume 26 that is built by distributed storage units of storage arrangements 200.

A storage arrangement 200 is an arrangement for providing a non-volatile storage area to a server device 20. Multiple storage arrangements 200 operate cooperatively as distributed storage units and accept data transmission and reception to/from multiple server devices 20. A storage arrangement 200 has a configuration equivalent to a general computer architecture including a processor, a volatile memory, and others and its storage functionality is implemented by software called a distributed storage controller 201.

An OS 213 runs on the storage arrangement 200 to control respective physical resources. The distributed storage controller 201 does not provide a storage device 202 present in the storage arrangement 200 directly to a server device 10; instead, it further defines a logical structure to facilitate configuration management. More specifically, the distributed storage controller 201 defines a file system in which respective storage devices 202 are bundled into a RAID group 203 and builds storage containers 204 that it uses.

A storage container 204 is realized as a set of files and directories in the file system. When a storage area is provided to a server device 20, a capacity is allocated from multiple storage containers 204 to build a logical volume 216. A logical volume 216 that is configured by the distributed storage controller 201 is taken as a logical volume 26 from a server device 20. Configuration information is synchronized across respective storage arrangements 200 so that functionality can be continued even when a fault has occurred in one of the storage arrangements 200 or the network.

As above, in a physical aspect, a storage container 204 is fundamentally a set of storage devices 202 present in a storage arrangement 200. The storage devices 202 differ in various terms such as rotation speed and bandwidth of HDD and the degree of integration of SSD. Depending on a way of capacity allocation from the storage container 204, logical volumes 216 with different relationships between performance and capacity can be configured.

In this embodiment, as with grades defined in the first computer system 1S, logical volumes 216 having different characteristics are classified into multiple types and provided, which are referred to as volume types. Each storage arrangement 200 is further connected to the network 162 through a network interface 205 and a necessary management interface is run on it, so that a configuration change can be made in response to a request from the supervisory computer 401.

The storage arrangements 200 in the second computer system have an advantage in which IO performance of logical volumes 216 can be adjusted easily by a capacity allocation scheme via the storage containers 204. This also provides an advantage in which a capacity can be added easily when storage capacity consumed by logical volumes 216 has increased with continuing system operation.

On the other hand, because pieces of data stored in logical volumes 216 are distributed at different logical addresses, capacity is hard to shrink later. To reduce capacity, it is required to check file system usage information that is managed on the side of a server device 20 and delete only an unused address area or save only a used address area. Hence, the operator of the second computer system 2S, usually, does not accept shrinking capacity.

As will be described later, in most cases, a charge billed for a logical volume is determined by capacity. Once a rather large capacity has initially been estimated at the start of use, means for reducing the capacity after continued use are hard to get. Therefore, it can be said that a charge estimated at the time of appraisal is strongly influential throughout a long period of time.

The supervisory computer 401 runs a group of programs for management of configurations of the server devices 20 and storage arrangements 200 and realizes functionality of the system operation management console 400. These programs in a group are collectively termed as management programs and how they are organized will be described in conjunction with a detailed description of operation. The supervisory computer 401 may be built, divided into multiple computers, if necessary for making up the functionality of the system operation management console 400.

Figure 4B:
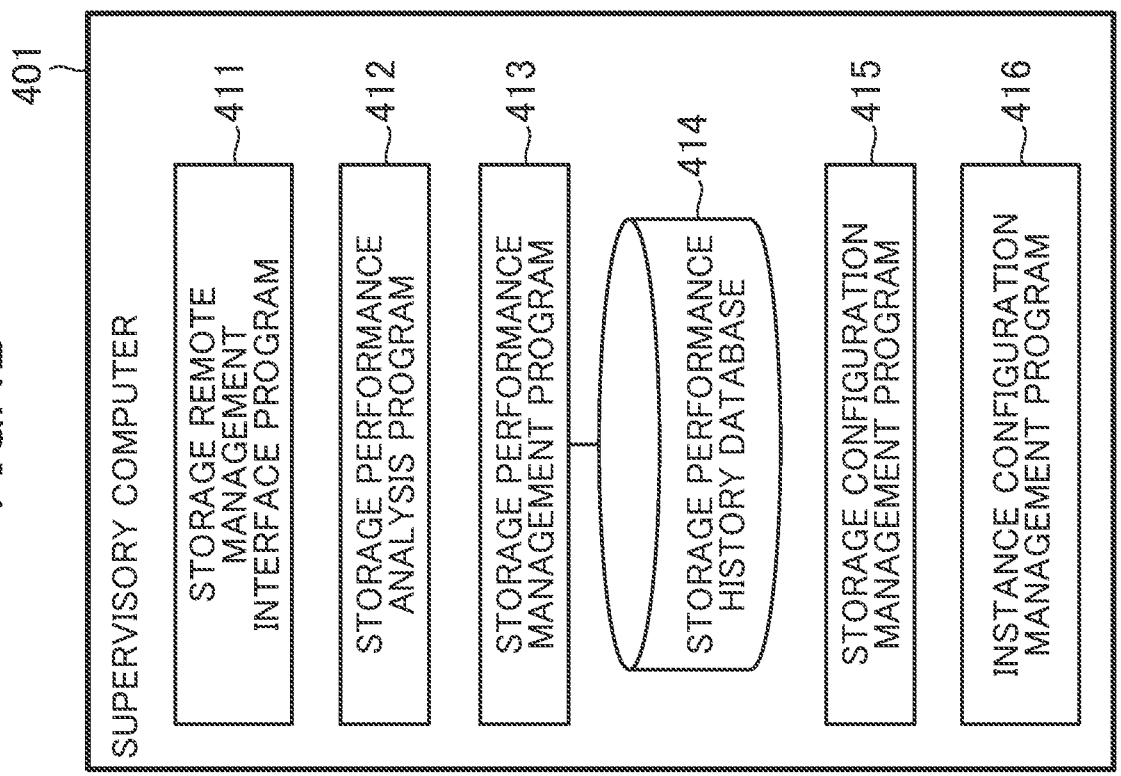
FIG. 4B is a diagram depicting an organization of programs in a supervisory computer of the second computer system according to the first embodiment.
Figure 4A:
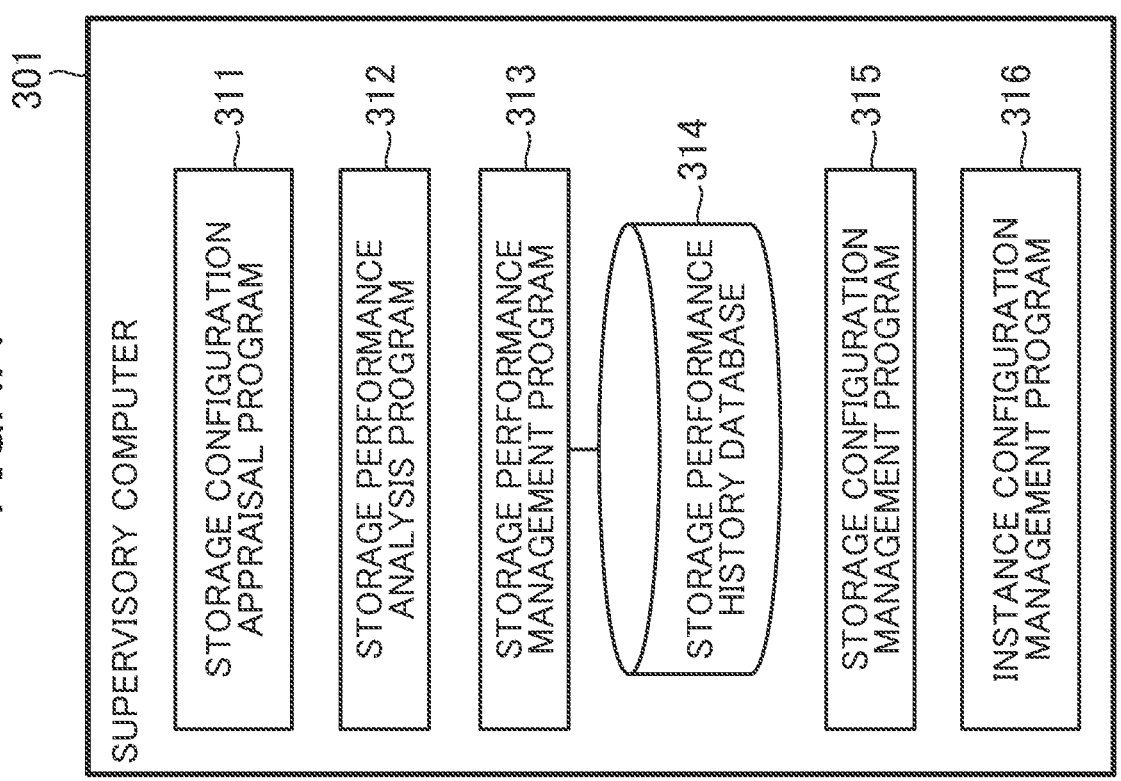
FIG. 4A is a diagram depicting an organization of programs in a supervisory computer of the first computer system according to the first embodiment.

FIG. 4A is a diagram depicting an organization of programs in the supervisory computer 301 of the first computer system 1S according to the first embodiment. On the supervisory computer 301, as management programs intended for management of configurations of respective devices and arrangements in the first computer system 1S, the following programs run: a storage configuration appraisal program 311, a storage performance analysis program 312, a storage performance management program 313, a storage configuration management program 315, and an instance configuration management program 316. Moreover, on the supervisory computer 301, a storage performance history database 314 for use by the storage performance management program 313 runs, allowing acquired performance information regarding the storage arrangements 100 to be stored.

Processing that is performed by the storage configuration appraisal program 311 will be described later.

The storage performance analysis program 312 analyses performance per logical volume 16 or virtual disk 17. Results of analysis by the storage performance analysis program 312 are managed as performance information by the storage performance management program 313.

The storage performance management program 313 manages performance of volumes in a storage arrangement 100 and provides their performance information to another management program on request. Performance information that the storage performance management program 313 manages using the storage performance history database 314 is, for example, volume performance information 321 in a form that is presented in FIG. 6; this information is results of analyzing performance acquired from the shared storage controller 101 of each storage arrangement 100 by the storage performance analysis program 312.

The storage configuration management program 315 manages logical and physical configurations of storage arrangements 100. More specifically, the storage configuration management program 315 manages configurations such as an allocation relationship among each logical volume 116, the storage pool 104, and a RAID group, a connection relationship between the network interface 52 and a logical volume 116, and allocation of a cache memory to a logical volume 116.

Furthermore, the storage configuration management program 315 provides functionality and information required for management of the storage arrangements 100 in conjunction with another management program. Besides, configuration information such as reserved capacity and actual usage capacity of a logical volume 116 and a ratio of allocatable media of storage devices 102, this ratio influencing the performance and price of the storage pool 104, is also managed by the storage configuration management program 315.

As mentioned previously, the storage hierarchies that are configured in a storage arrangement 100 pertain to the performance and price of resources that are finally offered to a user and, for example, managed as grade definition information 320 in a form that is presented in FIG. 5.

In a storage arrangement 100, the storage hierarchies are implemented by coordinating RIAD groups 103 to be linked to the storage pool 104 to satisfy performance of each grade in the grade definition information 320. Grades are a guideline for determining service conditions between a service provider and a user. It is here assumed that the user will choose a grade that meets performance requirements at his or her discretion and pay a fee in proportion of a capacity allocated to a volume. However, the user takes charge of the following: what file system is defined for logical volumes 116 and whether logical volumes 16 are used for application such as virtual disks 17. Therefore, the storage configuration management program 315 does not manage configurations that are controlled on the side of a server device 10.

The instance configuration management program 316 manages configuration information regarding computational resources for making applications 14 run on a server device 10. Such configuration information in this embodiment is, for example, instance configuration information 322 in a form that is presented in FIG. 7. Instance configuration information regarding computational resources for making applications 24 run on a server device 20 in the second computer system 2S is also in the same form.

FIG. 4B is a diagram depicting an organization of programs in the supervisory computer 401 of the second computer system 2S according to the first embodiment. On the supervisory computer 401, as management programs intended for management of configurations of respective devices and arrangements in the second computer system 2S, the following programs run: a storage remote management interface program 411, a storage performance analysis program 412, a storage performance management program 413, a storage configuration management program 415, and an instance configuration management program 416. Moreover, on the supervisory computer 401, a storage performance history database 414 for use by the storage performance management program 413 runs, allowing acquired performance information regarding the storage arrangements 200 to be stored.

The supervisory computer 401 is provided with the storage remote management interface program 411, which differs from the organization of programs in the supervisory computer 301 in the first computer system 1S. The reason for this is as follows: because the second computer system 2S is operated by another party (a cloud business operator) that differs from the administrator and user of the first computer system 1S and used, shared by multiple third parties, proper management functions and information are only provided remotely.

The storage remote management interface program 411 works in conjunction with a management program such as the storage performance management program 413 also running on the supervisory computer 401. However, functions and information that can be provided to an entity outside the second computer system 2S are controlled to be limited to a part of the whole depending on user privileges. More specifically, the storage remote management interface program 411 has, for example, such a function that, for an instance in instance configuration information 322 that is managed by the instance configuration management program 416, information that a particular user or user group is allowed to refer to and change is controlled to be accessed by only the owner of the instance.

In the second computer system 2S, services are offered in such a manner that the infrastructure operator distributes resources of the computer system to multiple users and allows the users to use them on a pay-per-use basis. That is, an unspecified large number of users including the user of the first computer system 1S share and use the second computer system 2S and the user of the first computer system 1S cannot know usage status of other users.

As major examples of charging methods for use in the second computer system 2S, the following two ones are assumed: maximum performance-based charging and bucket-based charging. Depending on operator's service definition, as other items, chargeable options such as transfer bandwidth (the amount of data that is transferred per unit time), downstream transfer traffic, and snapshot may further be prepared as those subject to charging. For example, transfer bandwidth is a subordinate quantity that is obtained by multiplying IOPS, which will be described subsequently, by average IO size. Therefore, in the present embodiment, descriptions are provided focusing on design items that play an important role, particularly, in terms of performance requirements.

Besides, IOPS and transfer bandwidth are also termed as transaction and throughput, respectively, each of which is synonymous to the former and their principles that are described in the present embodiment are applicable uniformly. These charging methods mentioned above are defined per volume type and, for example, volume type information 420 in a form that is presented in FIG. 8 is managed by the storage configuration management program 415.

Maximum performance-based charging, termed herein, is a method in which a charge is determined by the maximum IOPS and storage capacity that have been set by user. For each logical volume 216, IOPS that it can provide is determined depending on storage capacity. A charge is determined by a user's setting of a value less than this IOPS as the maximum IOPS. For example, a user who is well aware of usage status of the storage resources and, besides, usage status of the system may set the maximum IOPS to a high value only during a peak period; this produces an effect of reducing ordinary charges.

On the other hand, in the case of bucket-based charging, a charge is determined by storage capacity set by user and a given amount of burstable IO. FIGS. 9A and 9B depict conceptual diagrams of a bucket based charging method. This method presumes a value (IO amount) called baseline performance 605 with respect to each logical volume 216 and ensures that IO more than the baseline performance 605 is processed within the range not exceeding a certain value called burstable IO.

Baseline performance 605 is defined in proportion to storage capacity. Flow-in IO 601 per unit time that has exceeded the baseline performance 60 is stored as burst IO and this state is likened to a (leaky) bucket 600. While flow-in IO 601 is below the level of the baseline performance 605 (reference numeral 604), it is not stored in the bucket. When the flow-in IO has exceeded the baseline performance 605, it begins to be stored in the bucket 600 (reference numeral 606). When the flow-in IO has reached the burstable IO, IO requests coming afterwards will be unsuccessful or delayed. If IO requests become less than the baseline performance 605, the IO stored in the bucket 600 decreases as much as flow-out IO 602 (reference numeral 607) and a room for accepting subsequent burst IO increases.

The amount of IO stored at a point in time can be expressed as a bucket balance using a ratio of that amount to the amount of burstable IO. Ideally, the bucket is designed so that the bucket balance 603 will be always less than 1 to the requested amount of IO.

Most cases of using bucket-based charging adopt a method in which burst IO below a predetermined quantity is not chargeable. In that case, by designing capacity in light of baseline performance 605, even resources for which a certain amount of burst IO is presumed can be used at a price set for baseline performance 605.

In each charging method, usage status of a logical volume 26 is measured, based on volume performance information 421 (FIG. 10) which is managed by the storage performance management program 413 and a charge for use is calculated according to the measurement.

Practically, IO load does not depend on IOPS only and varies depending on a large number of factors such as IO block length, IO characteristics such as a sequential-random ratio, a read-write ratio, and a cache use ratio, last-minute usage status, usage status for access from another server to the same controller.

Nevertheless, particularly for the second computer system 2S, context of usage specific to the second computer system 2S is assumed to include the following circumstances: the system operator and user are different ones; multiple users share the same device/arrangement; and fairly distributing resources is a requisite. For this reason, the system adopts specifications allowing it to design IO performance with a very small number of design parameters. The charging methods described herein strongly depend solely on two design values, capacity and IOPS. This is due to circumstances where limitation to a few number of parameters is an inevitable choice, not meaning that other design parameters can be excluded because there are not dominant.

In each charging method, assuming that, before and after migration of a storage area, the storage area is used from the same application and a comparable server device configuration, IO performance in the migration destination has to be designed to be able to accept former IO requests that took place in the migration source in terms of performance requirements. As described previously, the IO performance is defined to have a relation to capacity and capacity must be considered to satisfy the IO performance. In this regard, two metrics of IO performance are important: the amount of IO occurring in a stationary manner and the amount of IO increased for a very short period. Because the charging method differs by type of volumes, even in a case where capacity and an integrated amount of IO are constant, the most costly charging method may differ depending on time, if the IO characteristics per unit time vary.

<Overview of Appraisal Program>

Figure 11:
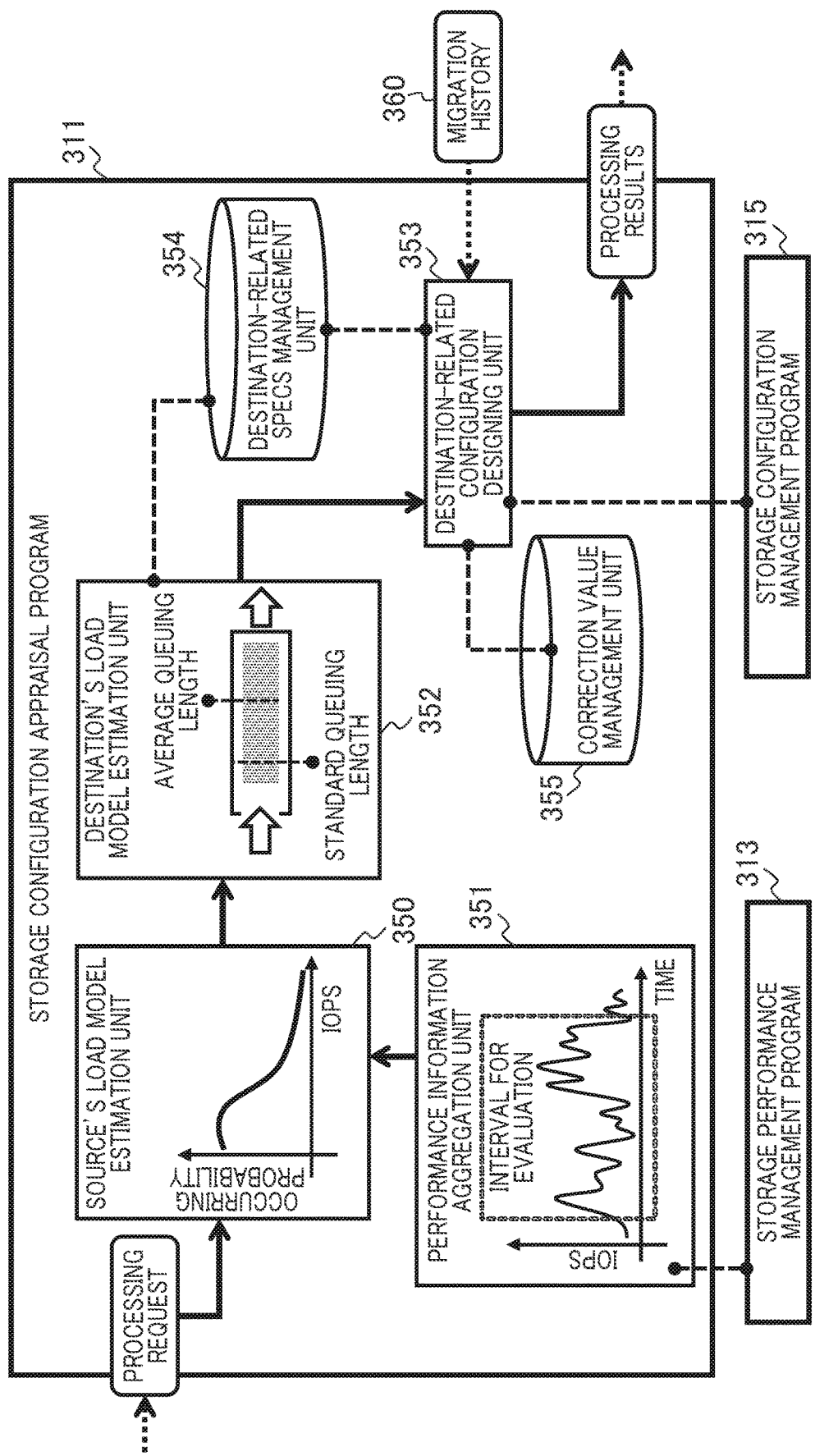
FIG. 11 is a diagram depicting an overview of a storage configuration appraisal program according to the first embodiment.

FIG. 11 is a diagram depicting an overview of the storage configuration appraisal program 311 according to the first embodiment. Appraisal in the present embodiment is explained below. Specifying, particularly, storage resources in the first computer system 1S is regarded as a processing request. Supposing that those resources are migrated to the second computer system, the appraisal is calculating a charge for using the resources and design values of, inter alia, capacity and IO performance in the destination computer system as processing results. The wording "appraisal" has the same meaning even where it is used in combination of other terms, unless otherwise described specifically; e.g., an appraisal method and an appraisal program refer to a method for making appraisal and a program that implements processing with regard to appraisal, respectively.

Here, migration of storage resources from the first computer system 1S to the second computer system 2S is considered. For convenience, the first computer system 1S in the present embodiment may be referred to as the source of migration and second computer system 2S may be referred to as the destination of migration.

The storage configuration appraisal program 311 is principally configured including a source's load model estimation unit 350, a destination's load model estimation unit 352, and a destination-related configuration designing unit 353. The storage configuration appraisal program 311 includes other units that are provided by function of each, as necessary: for example, it includes a performance information aggregation unit 351*a* for the purpose of acquiring and processing performance data required for processing by the source's load model estimation unit 350 from the storage performance analysis program 312; it includes a destination-related specs management unit 354 that manages destination-related information required for processing by the destination's load model estimation unit 352 and the destination-related configuration designing unit 353; and it includes a correction value management unit 355 that manages a correction value required for processing by the destination-related configuration designing unit 353.

The storage configuration appraisal program 311 generally implements processing that comprises modeling a load in the source of migration, applying this load model to a model that represents likewise a load in the destination of migration, determining design values to meet performance requirements and other requirements, and repeating the same procedure for determining design values for each of multiple volume types that are present.

The source's load model estimation unit 350 is the unit that statistically models the load (IOPS) of storage resources specified in the first computer system 1S which is the source of migration. More specifically, assuming that, for example, an occurring probability of IOPS conforms to an exponential distribution and a Poisson distribution, this unit determines, inter alia, average and dispersion parameters in a comparable manner using a maximum likelihood method. Likewise, the unit determines these parameters to be comparable to a particular convoluted kernel function by kernel density estimation of a normal distribution.

A method for estimating a population distribution of source's load models is implemented by an iterative algorithm and machine learning. Source's load models are created per logical volume 19 or virtual disk 17. Input (learning data) is performance data of resources for which load models should be created; this performance data is acquired from the storage performance analysis program 312 and is the data that has been subjected to consolidation processing of the performance information aggregation unit 351, i.e., subjected to aggregation, resampling, and missing value processing for a predetermined interval for evaluation.

As parameters determined by the source's load model estimation unit 350, e.g., an average and a dispersion of a population distribution that give an occurring probability are used in subsequent processing of the destination's load model estimation unit 352. If, for a source's load, its non-stationary characteristic (in which the moving average varies with respect to the time axis) is strong, population distribution estimation is limited to stationary components only and a non-stationary trend and periodic components may be further modeled separately as a regression problem.

Besides, if appraisal of requested resources involves intervals in future, an average of the above-mentioned population distribution is shifted, taking non-stationary components into account. Also, if, by kernel density estimation or the like, a source's load model is presumed to be of a mixture distribution in conformity to multiple probability distributions, respective population distributions (kernel functions) are estimated and, correspondingly, separate destination's load models are considered. In this case, results of appraisal are represented as a linear combination of results weighted by the output of each destination's load model.

The destination's load model estimation unit 352 is the unit that models a possible load of a logical volume 26 based on specifications defined for a volume type in the second computer system 2S which is the destination of migration. Here, let us consider the use of a queue model based on requirements of IO performance in a charging method. In this queue model, it is assumed that an arrival process of IO to enter queuing is comparable to a load estimated by the source's load model estimation unit 350, capability per unit time of processing IO leaving the queue is comparable to performance (baseline performance 635) of a destination logical volume, and the amount of IO in a queuing state is comparable to the IO amount stored in the bucket in the bucket-based charging method.

Given that the source's load can be modeled by an exponential distribution and a Poisson distribution in a simplest manner, the destination's load can be determined analytically using, inter alia, average and dispersion parameters of the queue. Therefore, in this case, it is not necessary to determine a model using machine learning and other iterative methods in order to estimate the destination's load. In this respect, throughput consumed for estimation can be reduced.

More specifically, given that the destination's load is modeled as a queue, an average of IO stored in the bucket is equivalent to an average queuing length of the queue and a degree of how the stored IO increases and decreases is represented by a dispersion of the queue. In this regard, a particular percentile that is determined from a dispersion of the queue is referred to as a standard queuing length, as the bucket balance is regarded as a sufficiently large value, but not a maximum.

However, under a situation where, particularly, storage arrangements 200 in the destination of migration are put under loads from an unspecified large number of server devices 20, there may be those other than storage resources that are subject to appraisal by the storage configuration appraisal program 311 having an effect on the performance of the same logical volume 216. Additionally, design values are limited to a few ones, as noted previously, and there remains a possibility that performance metrics for finding how much other resources requested have an effect on the logical volume cannot be obtained satisfactorily. Therefore, nominal specifications provided by the operator of the second computer system 2S are not necessarily guaranteed strictly.

The destination-related configuration designing unit 353 carries out designing of capacity and IO performance of a particular volume type, based on the parameters determined by the destination's load model estimation unit 352, involving correction with a predetermined correction value according to information provided from the correction value management unit 355 and the storage configuration management program 315. In principle, in the maximum performance-based charging method, a standard queuing length is equivalent to a maximum IO design value. In the bucket-based charging, an average queuing length is equivalent to baseline performance and a standard queuing length is equivalent to performance during a burst. These values are corrected in view of the characteristics of the second computer system 2S, i.e., it is not easy to shrink storage capacity.

In particular, values resulting from multiplying each parameter output by the destination's load model estimation unit 352 by a design correction value defined per grade as a coefficient are taken as design values based on performance requirements. A design correction value used here is a positive number that gives a ratio between the resource amounts before and after correction. Design correction values are retrieved through reference to grade definition information 320 managed by the storage configuration management program 315 and managed by the correction value management unit 355 within appraisal processing. Grades are those in which priority between user-expected performance and price is reflected. For a grade in which performance has priority over price, design values approximating to the parameters determined to meet performance requirements are used. For a grade in which price has priority over performance, design values obtained from revising determined parameters downward so much (changing it to be smaller) are used. These design values are results obtained in terms of performance requirements.

Thereby, in the case of migrating resources of a grade in which price has priority, a result in which an estimated charge is small is obtained, though performance could run short. Even if performance shortage should occur after actual migration performed following a result of appraisal in which such a low charge is estimated, it is possible to compensate for shortage of IO performance with ease by adding a capacity in the second computer system 2S after the migration. In addition, the destination-related configuration designing unit 353 makes comparison between the capacity (reserved or actually used capacity) of each logical volume 116 and the design value of capacity according to performance requirements, takes a larger value as a final design value, and makes an adjustment so as to satisfy conditions of both.

The destination-related configuration designing unit 353 also verifies other design items. If some volume type does not meet functional requirements, for instance, in a case where, when a logical volume 16 or a virtual disk 17 which is the source of migration has a storage area for booting an OS, a volume type assigned as the destination does not support the OS booting, it judges the volume type as an inappropriate destination. Also, as a final result of processing, the aim is to present a destination-related resource configuration that is optimum in terms of cost. However, in case that a multi-faceted evaluation is demanded as information for user decision making, a configuration appraised from perspectives other than charges is also presented as a processing result.

In the present embodiment, destination-related information does not include hysterical data, such as information regarding actual performance of migration, e.g., information as to how IO performance of similar storage resources changed when the resources were actually migrated in the past. In this embodiment, the destination-related specs management unit 354 that provides destination-related information only handles prior information such as specifications about the charging methods disclosed by the operator of the second computer system 2S. It is implied that the appraisal method described in the present embodiment can be implemented, for instance, even when information about operating status of the second computer system 2S is not acquired at all.

<Storage Configuration Appraisal Processing of the First Embodiment>

Figure 12:
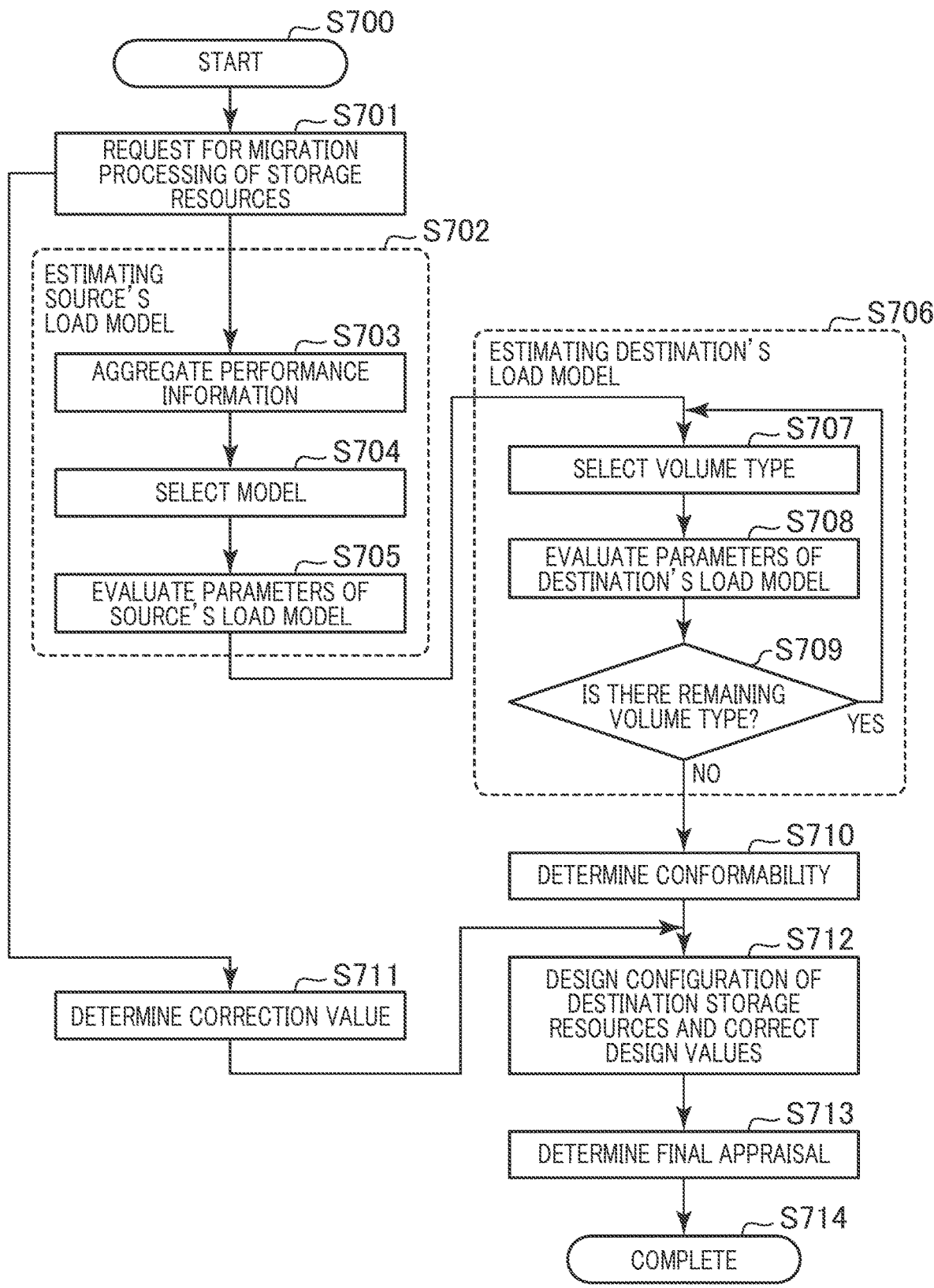
FIG. 12 is a flowchart illustrating storage configuration appraisal processing according to the first embodiment.

FIG. 12 is a flowchart illustrating storage configuration appraisal processing according to the first embodiment. Processing described below is mainly executed by the storage configuration appraisal program 311 on the supervisory computer 301.

At step (hereinafter, step is described as "S") 700, the storage configuration appraisal program 311 starts the processing flow by accepting an instance or storage resources specified to be migrated by user. In light of that resources are abundantly provided in the second computer system 2S which is the destination of migration, if there is a plurality of resources to be migrated, appraisal can be made in the same way for the plurality of resources at least by applying the present processing flow iteratively. At S700, a user may also issue a request regarding appraisal processing, such as, as to whether or not to take out only a result that produces a maximum effect from results of appraisal.

At S701, the storage configuration appraisal program 311 identifies the instance or storage resources specified to be migrated in a request for migration processing accepted at S700. At S701, the storage configuration appraisal program 311 finds a target logical volume 116 matching for the specified instance or storage resources and also finds its identifier (volume ID) required for acquiring a configuration including a grade, usage capacity, etc. and performance information. Upon termination of S701, the storage configuration appraisal program 311 moves processing to a step of estimating a source's load model 702 (S703 to S705) and a step of determining a correction value S711. The step of estimating a source's load model 702 is executed by the source's load model estimation unit 350 of the storage configuration appraisal program 311.

At S703, the source's load model estimation unit 350 acquires performance information of the target logical volume 116 found at S701 using its identifier found at S701 from the storage performance management program 313. The performance information aggregation unit 351 within the storage configuration appraisal program 311 performs consolidation processing of performance information acquired from the storage performance analysis program 312.

As depicted in FIG. 11, in the consolidation processing of performance information, mainly, data about IOPS changing over time for a predetermined interval for evaluation is processed to be fit for estimation of a source's load model. As the predetermined interval for evaluation, a default one may be used or an interval may be specified by the user whenever resources are specified at S700. It is desirable that the predetermined interval for evaluation is at least a period that has so far been adopted for sampling to some extent of time in the source's environment and a period including high load moments.

At S704, the source's load model estimation unit 350 selects a suitable model as a source's load model. At S704, for instance, if appraisal for the same storage resources was carried out in the past, this unit selects the same model as used for that appraisal. If there is time allowance for appraisal processing, evaluation may be made actually using multiple models and one of them with the least modeling error may be selected.

At S705, the source's load model estimation unit 350 estimates parameters with respect to the source's load model selected at S704. Most simply, assuming the use of a population distribution such as a single Poisson distribution, as mentioned previously, this unit estimates an average arrival rate to be input to a later step of estimating a destination's load model S706. Upon termination of S705, the storage configuration appraisal program 311 moves processing to the step of estimating a destination's load model S706 (S707 to S709). The step of estimating a destination's load model S706 is executed by the destination's load model estimation unit 352 of the storage configuration appraisal program 311. In the step of estimating a destination's load model, load evaluation per volume type is performed.

At S707, the destination's load model estimation unit 352 selects one of volume types for which evaluation has not been made in all volume types presumed to be a possible destination of migration. At S708, the destination's load model estimation unit 352 evaluates parameters of the destination's load model of the volume type selected at S707, supposing that this volume type is the destination of migration. Specifications defining the exit rate and maximum queuing capacity of a destination's load model are managed by the destination-related specs management unit 354. If the source's load can be modeled as an arrival process in the step of estimating a source's load model 702, the destination's load can be modeled as a queue. An average queuing length and a dispersion of the queue can be evaluated in the step of evaluating parameters of the destination's load model.

At S709, a decision is made as to whether there is a remaining volume type for which the above-mentioned parameters are not evaluated among all volume types presumed to be a possible destination of migration. If there is a remaining volume type (Yes, S709), the processing moves to step S7007; if there is no remaining volume type (No, S709), the processing moves to step S710.

At S710, among volume types for which load was estimated at S707, the destination-related configuration designing unit 353 finds a volume type that is conformable to the destination's IO load and other requirements. The step S710 can be implemented in such a manner that the destination-related configuration designing unit 353 acquires the configuration of the storage resources specified to be migrated from the storage configuration management program 315 and compares the configuration against the specifications of the relevant logical volume 116, as described previously. For instance, if the usage capacity of the logical volume 116 in the source of migration is beyond the capacity that can be provided by the relevant volume type, this volume type is regarded as non-conformable and excluded.

On the other hand, at S711, the storage configuration appraisal program 311 determines a correction value according to the grade of the logical volume found at S701 and stores it into the correction value management unit 355. At S712, based on the destination's load model for the volume judged conformable at S710, the destination-related configuration designing unit 353 designs the resource configuration of destination storage resources in the second computer system 2S and corrects the design values regarding this designing by multiplying them by the design correction value determined at S711. The design values are, inter alia, capacity and IO performance that have a direct relation to a charge for the destination storage resources.

At S713, the destination-related configuration designing unit 353 makes a final decision of the design values and the charge for the resources after being migrated, which will be presented as final appraisal results. At S714, the destination-related configuration designing unit 353 displays, to the user, a set of values as follows: conclusive design values determined at S713, uncorrected design values as the basis of calculating the conclusive design values, a design correction value by which the uncorrected design values were multiplied, etc. or transfers the set of values to another management program that the user uses, and terminates the storage configuration appraisal processing. Alternatively, at S714, in response to a request specified by the user at the start of the processing, this unit may make results presentation as follows: it may present only the design values of a resource configuration for which the charge is least and/or only the design values of a resource configuration for which the design margin of a performance value is greatest.

According to the present embodiment, for instance, when storage sources are going to be migrated from the first computer system 1S which is assumed to run in on-premises environment to the second computer system 2S which is assumed to run in a public cloud environment, the functionality of appraising in advance a configuration of matching resources in the destination of migration is provided. Even when detail of configurations and usage status of resources in the destination of migration are unobvious, it is possible to derive principal design values and reduce throughput required for sizing. It is also possible to correct an estimated quantity of resources according to the conditions of using the source resources and constrain the cost for storage utilization.

Second Embodiment

Supposing that storage resources running in an on-premises environment are migrated to a public cloud, a system for appraising a configuration of matching resources in the public cloud and modifying the appraisal method from information regarding operation after migration that was actually performed in the past is provided as a second embodiment of the invention. The present embodiment is to implement a more accurate appraisal method in addition to the foregoing first embodiment.

The system configurations and the contents of processing by the management programs are mostly common with the first embodiment. Differences from the first embodiment are solely described hereinafter.

One of the points of the present invention is modeling the loads in the source and destination of migration, as described previously. However, difference may arise between the load as a result of appraisal and the load in actual operating status in the destination system. The system according to the present embodiment is provided with additional functionality for improving the appraisal method based on, particularly, the modeling error in estimating a source's load model and a destination's load model.

More specifically, the destination-related configuration designing unit 353 of the storage configuration appraisal program 311, which is one of the management programs, implements processing for improving the appraisal method based on migration history 360 that represents status after migration (see FIG. 11). The migration history 360 termed herein is historical data as follows: time-series change of IOPS of destination storage resources and time-series data of bucket balance in the case of bucket-based charging, associated with design values; i.e., actual values regarding charge calculation and destination's load. The migration history 360 can be acquired via the storage remote management interface program 411 and through the use of a monitoring function that is supported in the second computer system 2S.

Modeling error of the source's load model estimation unit 350 is mainly related to efficacy of a procedure for consolidating performance data in the source of destination. As mentioned previously, a particular probability population distribution is assumed as a source's load model. Error occurs between actual data and the model depending on the setting of an interval for sampling actual performance data which is used for parameter estimation in the first computer system 1S and the selection of a probability distribution. In the present embodiment, estimation with higher accuracy is performed by adjusting the method for consolidating performance data and model selection.

Modeling error of the destination's load model estimation unit 352 is mainly related to how much disturbance occurs in the second computer system 2S. A destination's load model represents nominal performance characteristics provided by the second computer system 2S. Error from nominal values occurs due to conflict with loads for other users in the second computer system S2 and the effect of other design values influencing performance, as described previously. In the present embodiment, a disturbing factor in the destination of migration (second computer system 2S) is evaluated using the error occurring before and after migration and the appraisal method is adjusted.

According to the present embodiment, estimation of the source's and destination's loads is made using a mathematical model to express a relationship between quantities having a dominant relation to the characteristics of loads and resources and the configurations of resources. Because destination resources are designed based on user behavior and conditions of use of source resources, it is possible to perform sizing of destination resources suitably and efficiently. Also, an increase in the cost for using the resources by overestimating margins (design margins) is constrained.

Furthermore, according to the present embodiment, even when detail of configurations in the destination of migration is unobvious, it is possible to derive principal design values (such as capacity and IOPS). Also, the cost for load estimation processing is constrained from increasing by using an analytical model and, thereby, throughput required for sizing destination resources is reduced. Besides, using design correction values (FIG. 5) according to the conditions of using the source resources (grades that designate service levels requested), design values are corrected to decrease an estimated quantity of resources. Thereby, it is possible to suitably appraise storage resources or the like that are hard to reduce afterwards, while constraining the cost for using the resources.

<Storage Configuration Appraisal Processing of the Second Embodiment>

Figure 13:
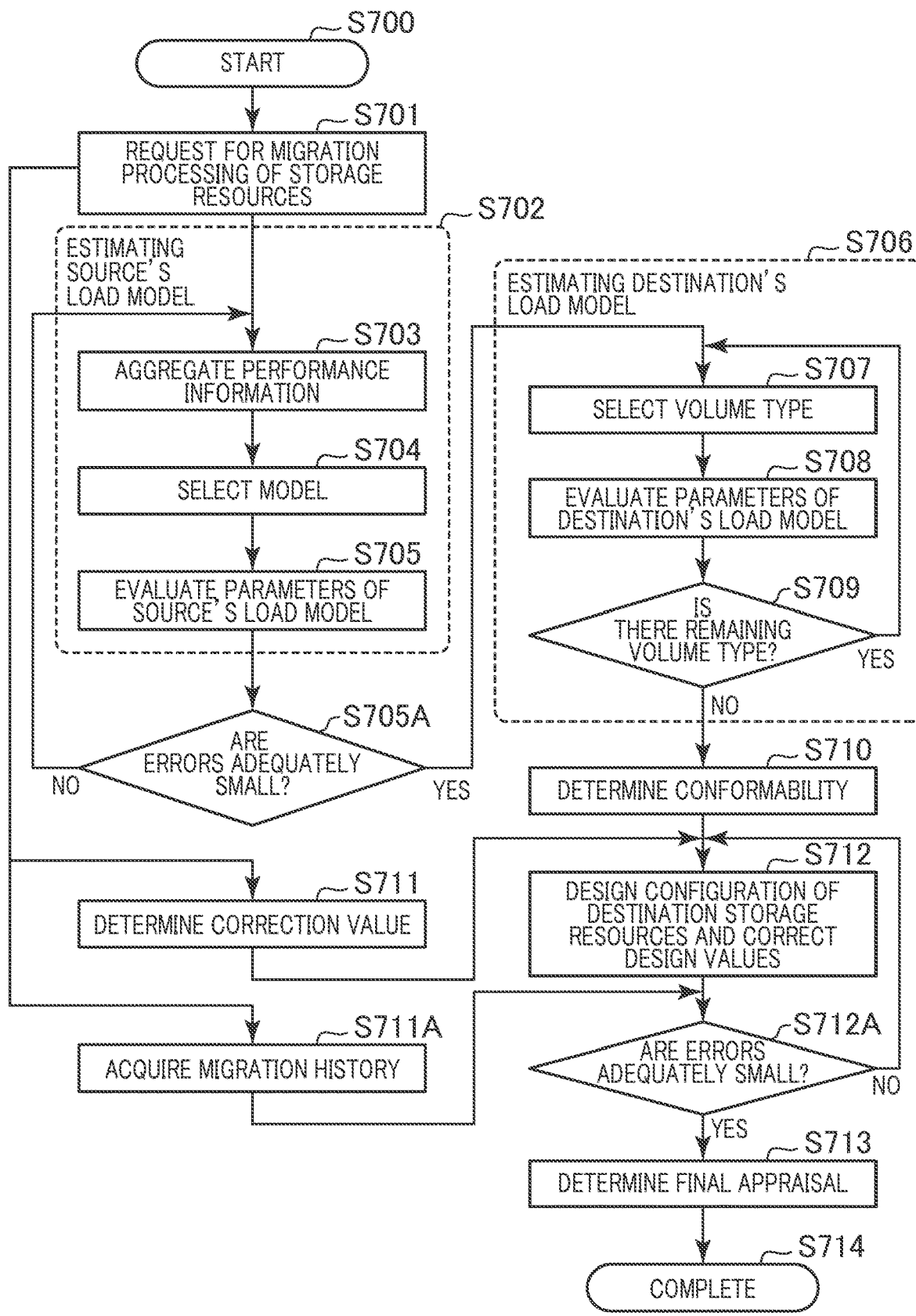
FIG. 13 illustrates a flowchart of processing according to the second embodiment.

FIG. 13 is a flowchart illustrating storage configuration appraisal processing according to the second embodiment. In the flowchart of storage configuration appraisal processing of the second embodiment, steps corresponding to those in the flowchart of appraisal processing of the first embodiment area assigned identical step numbers and their description is omitted.

Appraisal processing of the second embodiment is mainly executed by the storage configuration appraisal program 311 on the supervisory computer 301, as with the first embodiment. In appraisal processing of the present embodiment, at step S700, the storage configuration appraisal program 311 starts the processing flow by accepting an instance or storage resources specified to be migrated by user, as with the first embodiment.

Upon termination of S701, the storage configuration appraisal program 311 moves processing to a step of estimating a source's load model S702 (S703 to S705), a step of determining a correction value S711, and a step of acquiring migration history S711A.

As with the first embodiment, the step S702 includes processing as follows: acquiring and aggregating performance information of a logical volume 116 using its identifier found at S701 (S703); selecting a suitable model as a source's load model based on aggregated performance information (S704); and estimating parameters with respect to the selected source's load model (S705). At S705, for instance, assuming that the source's load model is a probability population distribution such as a Poisson distribution, estimation is made of an average arrival rate to be input to a destination's load model.

Here, performance information in the present embodiment is subjected to consolidation processing by the performance information aggregation unit 351, as with the first embodiment. However, depending on the result of evaluating the modeling error to be performed at S705A after the step of estimating a source's load model 702, a period during which performance information is consolidated may be modified.

In the first computer system S1, performance information sampled in a situation where load differs significantly from ordinary processing load of the applications 14, particularly, when a server device 10 is booted or software is updated, is contradictory to the purpose of modeling. Therefore, by reviewing a target period to exclude such information from performance information to be consolidated, there is a possibility that the modeling error can be eliminated. Depending on the result of the decision as to whether or not the modeling error falls within an adequately permissible range at S705A, aggregating performance information may be re-executed at S703. Consequently, the model selected at S704 may be altered. At S705A, the modeling error is evaluated by examining the source's load model and judging its reliability.

After deciding that the modeling error falls within an adequately permissible range at S705A, the storage configuration appraisal program 311 moves processing to a step of estimating a destination's load model S706 (S707, S708, and S709). Then, the storage configuration appraisal program 311 executes S710 and S712 following S706.

At S711, the storage configuration appraisal program 311 determines a design correction value based on the grade of the logical volume found at S701. This value is managed by the correction value management unit 355. At S712, based on the destination's load model for the volume judged conformable at S710, the destination-related configuration designing unit 353 designs destination storage resources in the second computer system 2S and modifies the design values regarding this designing based on the design correction value determined at S711. Nevertheless, if a disturbing factor is involved in the destination second computer system 2S, the design correction value determined at S711 has to be further reconfigured.

Therefore, in the present embodiment, at S712A, the destination-related configuration designing unit 353 retrieves historical data of actual performance of migration of resources having a similar configuration to the relevant volume that is subject to appraisal and calculates an error between the actual settings of design values of destination resources based on the above historical data and the corresponding values resulting from estimating a destination's load model S706. If the error is equal to or more than a predetermined value, the destination-related configuration designing unit 353 re-executes S711 to reconfigure the design correction value and correct the parameters of the destination's load model; if the error is less than the predetermined value, it moves processing to S713.

How the design correction value should be reconfigured at S712 is explained below. For instance, when it is presumed that there is significant disturbance and a conflicting processing load is already running in the second computer system S2, the design correction value should be reconfigured to a higher one and sizing is performed to allocate more resources than the output estimated by the step of estimating a destination's load model S706. When it is presumed that there is little disturbance and any conflicting processing load is not running in the second computer system S2, the design correction value should be reconfigured to a lower one and sizing is performed to get a smaller quantity of resources to a possible extent more optimistically than the model's output.

More specifically, for instance, when the amount of correction made by the design correction value is small and the bucket balance in the migration history is small in respect of a grade in which price has priority over performance, i.e., when it is presumed that no disturbance occurs, the design correction value should be revised downward to further decrease the result of sizing. Conversely, when it is presumed that there is significant disturbance and when source resources to be migrated is of a grade in which performance has priority, the design values should be revised to allocate more resources, i.e., lowered, but to a smaller extent, by the design correction value.

According to the present embodiment, by correcting the result of sizing to be adaptive to actual usage status based on migration history of resources migrated in the past and having a similar configuration to resources that are going to be migrated, it is possible to improve the accuracy of configuration appraisal of the resources after being migrated, in addition to advantageous effects of the first embodiment. Now, mathematical models that express the source-side and destination-side behaviors, which are adopted in the appraisal method, are explained below. Consistently, analytical models are used, though differing in terms of how to select a model type, how to select performance information for model evaluation, or how to adjust parameters. This can avoid complication of source-side and destination-side models. The analytical models express a relationship between dominant physical quantities, unlike models of a kind that could be formed by machine learning and using combined explanatory variables and quantities and random variables. The models herein have an advantage of enabling it to find how to use difference from actual operation results to modify the result of sizing.

Additionally, in the first and second embodiments, a predetermined range for evaluating the modeling error in S705A and/or a predetermined value for evaluating the error in S712A may be adjusted according to input/output characteristics of source storage resources. For instance, let us consider a case where the charge for downstream transmission of information from a computer system to a network is higher than upstream. In this case, in input/output (read/write) transactions of source storage resources to be migrated in the first computer system 1S, when the proportion of read operations is larger, the predetermined range in S705A and/or the predetermined value in S712A should be set smaller to increase the accuracy of evaluation. Conversely, when the proportion of write operations is larger, the predetermined range in S705A and/or the predetermined value in S712A should be set larger to moderate the accuracy of evaluation. In this way, by adjusting the accuracy of evaluation in S705A and/or S712 according to the IO characteristics of source storage resources when the storage resources are going to be migrated, it is possible to design a configuration of destination resources with more strict consciousness of cost.

Besides, the foregoing descriptions of the first and second embodiments assumes that the first computer system 1S runs in an on-premises environment and the second computer system 2S runs in a public cloud environment. However, this is non-limiting. In one case of implementation, the first computer system 1S may run in a public cloud environment and the second computer system 2S may run in an on-premises environment. In another case of implementation, both the first computer system 1S and the second computer system 2S may run in a public cloud environment. That is, it makes no matter whether the running environment of the first computer system 1S and the second computer system 2S is an on-premises environment or a public cloud environment.

<Computer 5000 that Implements the Supervisory Computer 301, 401>

Figure 14:
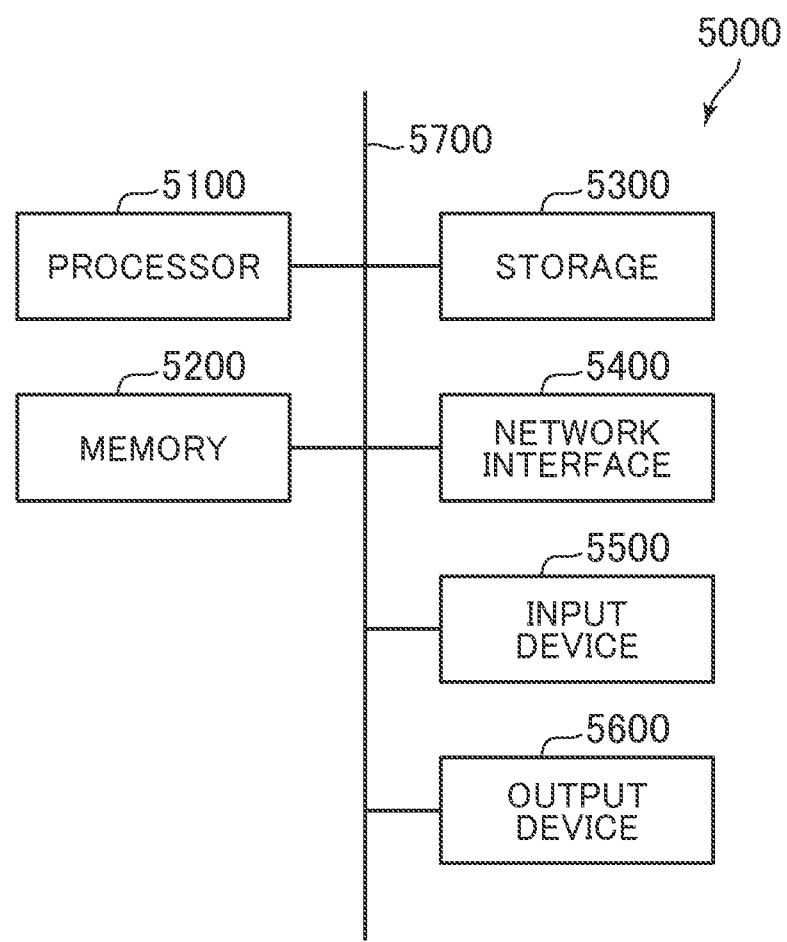
FIG. 14 is a hardware diagram of a computer that implements each individual machine such as a supervisory computer.

FIG. 14 is a hardware diagram of a computer 5000 that implements each individual machine such as the supervisory computer 301, 401. In the computer 5000, a processor 5100, a memory 5200, a storage 5300, a network interface 5400, an input device 5500, and an output device 5600 are interconnected via a bus 5700. The processor 5100 is a CPU (Central Processing Unit) or the like. The memory 5200 is a RAM (Random Access Memory) or the like. The storage 5300 is an HDD (Hard Disk Drive), SSD (Solid State Drive), or a medium reading device among others. The input device 5500 includes a keyboard and a mouse or a touch panel among others. The output device 5600 is a display or the like.

In the computer 5000, respective programs for implementing each individual machine mentioned above are read from the storage 5300 and executed by cooperation of the processor 5100 and the memory 5200; thereby, each machine is implemented. Alternatively, the respective programs for implementing each individual machine may be acquired from an external computer through communication via the network interface 5400. Alternatively, the respective programs for implementing each individual machine may be recorded in a portable recording medium (such as an optical disk or a semiconductor storage medium), read by the medium reading device, and executed by cooperation of the processor 5100 and the memory 5200.

Note that the present invention is not limited to the embodiments described hereinbefore and various modifications are included therein. For example, the foregoing embodiments are those described in detail to explain the present invention clearly and the invention is not necessarily limited to those including all components described. Besides, a subset of the components of an embodiment may be replaced by components of another embodiment and components of another embodiment may be added to the components of an embodiment. In other words, it is possible to combine each embodiment and each modification unless there is a contradiction within the scope of the technical concept of the present invention. Moreover, components and processing steps in an embodiment may be redeployed or united appropriately. Besides, for a subset of the components of each embodiment, other components may be added to the subset or the subset may be removed or replaced by other components. Furthermore, information such as programs, tables, and files implementing each individual component can be placed in a recording device such as a memory, hard disk, or SSD (Solid State Drive) or a recording medium such as a card with an integrated circuit, a semiconductor recording medium, or an optical recording medium.

What is claimed is:

1. A system for appraising a resource configuration of second resources to be built by migrating first resources existing in a first computer system, which is the source of migration, to a second computer system, which is the destination of migration, the system comprising:
   a source's load model estimating unit that estimates a source load model, wherein the source load's model represents a load of the first resources in an expression of a probabilistic model;

a destination's load model estimation unit that estimates a destination's load model based on the source's load model, wherein the destination's load model represents a load of the second resources in an expression of a queue; and a destination-related configuration designing unit that compares performance requirements of the first resources against the destination's load model estimated by the destination's load model estimation unit, finds the destination's load model that is conformable to the performance requirements, and determines design values of the resource configuration based on the destination's load model found to be conformable, wherein the destination's load model estimation unit estimates an average queuing length of the queue and a standard queuing length that is a particular percentile to be determined from a dispersion of the queue length, wherein, when determining design values of the resource configuration, the destination-related configuration designing unit regards the average queuing length as a maximum IO design value if a charging method for storage resources of the second computer system is maximum performance-based charging, and regards the standard queuing length as performance during a bust if the charging method is bucket-based charging, and wherein the destination-related configuration designing unit corrects the design values of the resource configuration based on the destination's load model that is conformable to the performance requirements to decrease design margins of the resource configuration using a design correction value defined to meet a requested service level.

2. The system for appraising a resource configuration according to claim 1, wherein:

the first resources and the second resources are storage resources comprising multiple volume types;

the destination's load model estimation unit estimates the destination's load model with respect to each of the volume types of the second resources;

the destination-related configuration designing unit compares the performance requirements against the destination's load model estimated for each of the volume types by the destination's load model estimation unit and finds a volume type for which the destination's load model is conformable to the performance requirements; and the destination-related configuration designing unit modifies the design values of the resource configuration based on the destination's load model relevant to the volume type for which the destination's load model is conformable to the performance requirements using the design correction value.

3. The system for appraising a resource configuration according to claim 1, wherein:

the probabilistic model is a Poisson distribution, an exponential distribution, or a kernel of a normal distribution.

4. The system for appraising a resource configuration according to claim 1, wherein:

the first computer system is built in an on-premises environment; and the second computer system is built in a public cloud environment.

5. The system for appraising a resource configuration according to claim 1, wherein:

the source's load model estimation unit estimates the source's load model based on actual data of performance of the first resources for a period for evaluation and evaluates whether or not a modeling error regarding the estimated source's load model falls within a predetermined range; and if the modeling error falls outside the predetermined range, the source's load model estimation unit modifies the period for evaluation and re-estimates the source's load model based on actual data of performance of the first resources for the modified period.

6. The system for appraising a resource configuration according to claim 5, wherein:

the destination-related configuration designing unit adjusts the predetermined range for evaluating the modeling error according to input/output characteristics of the first resources.

7. The system for appraising a resource configuration according to claim 1, wherein:

the destination-related configuration designing unit reconfigures the design correction value and re-corrects the design values using the reconfigured design correction value when an error between actually applied design values based on a migration history of resources previously migrated and having a similar configuration to the first resources and the design values is equal to or more than a predetermined value.

8. The system for appraising a resource configuration according to claim 7, wherein:

when reconfiguring the design correction value, the destination-related configuration designing unit increases or decreases the design correction value according to the migration history and the requested service level.

9. The system for appraising a resource configuration according to claim 7, wherein:

the destination-related configuration designing unit adjusts the predetermined value for evaluating the error according to input/output characteristics of the first resources.

10. A method for appraising a resource configuration of second resources to be built by migrating first resources existing in a first computer system, which is the source of migration, to a second computer system, which is the destination of migration, the method comprising the steps of:

estimating a source's load model, wherein the source load's model represents a load of the first resources in an expression of a probabilistic model;

estimating a destination's load model based on the source's load model, wherein the destination's load model represents a load of the second resources in an expression of a queue; and designing a destination-related configuration, further comprising comparing performance requirements of the first resources against the estimated destination's load model, finding the destination's load model that is conformable to the performance requirements, and determining design values of the resource configuration based on the destination's load model found to be conformable, wherein estimating the destination's load model further comprises estimating an average queuing length of the queue and a standard queuing length that is a particular percentile to be determined from a dispersion of the queue length, wherein determining design values of the resource configuration further comprises regarding the average queuing length as a maximum IO design value if a charging method for storage resources of the second computer system is maximum performance-based charging, and regarding the standard queuing length as performance during a bust if the charging method is bucket-based charging, and wherein designing a destination-related configuration further comprises correcting the design values of the resource configuration based on the destination's load model that is conformable to the performance requirements to decrease design margins of the resource configuration using a design correction value defined to meet a requested service level.

\* \* \* \* \*